Figure 1:
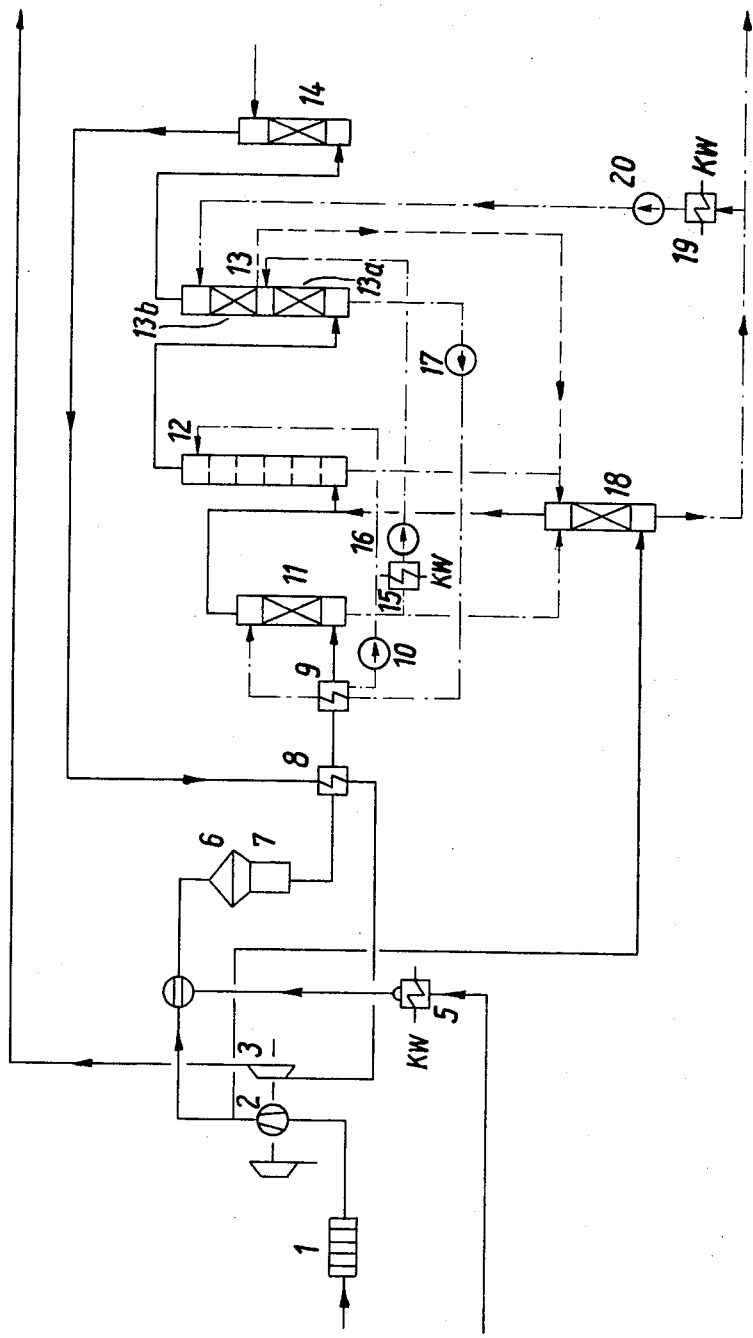

United States Patent [19]
Oberste-Berghaus et al.

[11] 3,716,625
[45] Feb. 13, 1973

[54] PROCESS FOR THE PRODUCTION OF NITRIC ACID WITH A CONCENTRATION OF OVER 70 PERCENT BY WEIGHT

[75] Inventors: Gerhard Oberste-Berghaus, 1 Berlin 39; Claus-Dieter Karau, 1 Berlin 41, both of Germany

[73] Assignee: Bamag Verfahrenstechnik GmbH, Butzbach/Hesson and Berlin, Germany

[22] Filed: Feb. 26, 1970

[21] Appl. No.: 17,997

[30] Foreign Application Priority Data

Feb. 28, 1969 Germany ............... P 19 11 200.6
Jan. 16, 1970 Germany ............... P 20 02 791.2

[52] U.S. Cl. .......................... 23/161, 23/160
[51] Int. Cl. .......................... C01b 21/40
[58] Field of Search .................. 23/160, 161, 162

[56] References Cited

UNITED STATES PATENTS

| | | | |
|---|---|---|---|
| 2,098,953 | 11/1937 | Christensen | 23/162 |
| 1,901,816 | 3/1937 | Lüscher | 23/162 |
| 3,399,965 | 9/1968 | Kalous | 23/162 |

FOREIGN PATENTS OR APPLICATIONS

| | | | |
|---|---|---|---|
| 808,234 | 1/1959 | Great Britain | 23/162 |
| 289,412 | 9/1929 | Great Britain | 23/160 |

OTHER PUBLICATIONS

Miles, F. D.; "Nitric Acid," pp. 12–13, 19–20, 49–50; Oxford University Press; London, 1961

Primary Examiner—Oscar R. Vertiz
Assistant Examiner—G. O. Peters
Attorney—Michael S. Striker

[57] ABSTRACT

Process of preparing nitric acid (having a concentration of over 70 percent by weight) by catalytically oxidizing ammonia with air to form $NO_2$, absorbing the $NO_2$ in water or aqueous nitric acid, increasing the partial pressure of the $NO_2$ partly by compression and partly by passage through the absorption stage, washing out the residual $NO_2$ with 60–70 percent nitric acid and recycling the same into the absorption stage, and blowing out the $NO_2$ through the nitrous gas products of the ammonia oxidation in a degasification stage arranged ahead of the absorption stage.

17 Claims, 3 Drawing Figures

PROCESS FOR THE PRODUCTION OF NITRIC ACID WITH A CONCENTRATION OF OVER 70 PERCENT BY WEIGHT

This invention relates to a process for the production of nitric acid having a concentration of over 70 percent by weight, by the absorption of $NO_2$ from nitrous gases in water or aqueous nitric acid, wherein the partial pressure of the $NO_2$ is increased in the absorption stage partly by compression of the nitrous gas and partly by passage of $NO_2$ through the absorption stage, and wherein the $NO_2$ remaining in the gas after the absorption stage is washed out by nitric acid (washing acid) preferably having a concentration of 60–75 percent by weight, and is then removed from the washing acid and led back to the absorption zone.

The raw material for use in the production of nitric acid is in general ammonia which by catalytic reaction with air is converted into NO and water according to the equation:

$$4NH_3 + 5O_2 \rightarrow 4NO + 6H_2O + \text{heat} \quad (1)$$

The NO reacts with further oxygen to form $NO_2$ according to the equation:

$$2NO + O_2 \rightarrow 2NO_2 + \text{heat} \quad (2)$$

After cooling the gas and separating off the reaction water in the form of acid condensate, and following the introduction of secondary air with the additional oxygen necessary for the formation of acid, the gases are passed to the absorption stage in which the $NO_2$ is absorbed in water or aqueous acid thereby forming nitric acid according to the equation:

$$3NO_2 + H_2O \rightarrow 2HNO_3 + NO + \text{heat} \quad (3)$$

The resulting NO then again oxidized to form $NO_2$ according to equation (2).

In the absorption stage, substantially all of the nitrogen oxide is absorbed up to a residual content of about 1,000 ppm (parts per million) of $NO + NO_2$. The gas and the acid are led in countercurrent flow relationship to one another. In the last absorption stage water is given off, whereas in the first stage at the entry of nitrous gas, the acid produced is removed. The acid condensate discharged upon condensation of the reaction water is passed into the absorption stage at locations of corresponding acid concentration.

The cost of absorption is dependent on the desired concentration of the acid produced, the required content of nitrogen oxides in the end gas, the temperature level in the absorption stage as well as the absorption pressure, i.e., the partial pressures of the nitrogen oxides and oxygen.

The quantity of nitrogen oxide which can be theoretically absorbed in each absorption step according to equation (3), is determined by the thermodynamic balance for the relevant absorption temperature. The quantity of $NO_2$ which can be absorbed increases for a given acid concentration and temperature with the total partial pressure of the nitrogen oxides and the degree of oxidation, i.e., the ratio between the $NO_2$ and the total nitrogen oxide content. The speed of the oxidation reaction according to Equation (2), increases according to Bodenstein with the square of the partial pressure of NO and linearly with the partial pressure of the oxygen.

It is possible to carry out the absorption under pressure. Modern nitric acid absorption processes are therefore carried out under a pressure of about 3 atmospheres up to a maximum of 10 atmospheres. Higher pressures are in general uneconomical as the decreased cost of absorption no longer compensates for the increased energy costs of gas compression.

In principle, two manners of proceeding have to be distinguished from one another. In the first, the ammonia oxidation and the absorption are effected under the same pressure; in the second, the ammonia oxidation is effected under a lower pressure and the nitrous gases, after the admission of secondary air are finally compressed to the higher absorption pressure. The second of the procedures has the advantage of a higher conversion of ammonia and a lower loss of platinum. Moreover, during the removal of the reaction water, less $NO_2$ is absorbed, so that the nitrogen oxide content at the entry into the absorption stage is higher. Because of the increased cost for the plant, this type of procedure is in general not sufficiently economical.

In the production of nitric acid, especially having a concentration of over 65 percent by weight, the cost of absorption increases very sharply in the conventional processes for producing so-called medium acid, so that the economic limits for these processes is about 70 percent by weight. The equilibrium curves for these acid concentrations lie at very high degrees of oxidation for the attainable nitrogen oxide partial pressures (for example, 0.6 atmospheres for an absorption pressure of 10 atmospheres), i.e., very low NO partial pressures, so that with only low quantities of $NO_2$ which can be absorbed according to Equation (3) in each absorption stage, the cost of re-oxidizing the NO according to Equation (2) becomes uneconomically high because of the long residence time necessary.

The level of the partial pressure therefore steadily decreases over the entire absorption zone down to the value necessary by reason of air impurities, so that the absorption of the residual part increases very considerably, — this also being caused by the small quantity of process water in the production of higher acid concentrations.

Processes are known in which the nitrogen oxide content in the absorption stage can be increased by interrupting the absorption at a definite nitrogen oxide content and washing out the residual nitrogen oxide with a higher percentage of nitric acid, for example 60 to 70 percent by weight. The nitrogen oxide which is dissolved in the form of nitrogen tetroxide is finally blown, i.e. stripped out from the washing acid by means of secondary air and in admixture therewith, enters the main nitrous gas stream in advance of the absorption zone. In this manner, the residual absorption zone is replaced by a less costly washing zone and moreover the $NO_2$ content in the absorption zone is increased. In evaluating these processes there are, however, certain disadvantages.

In the processes in which the ammonia oxidation and the absorption are carried out under approximately the same pressure, the secondary air together with the oxidation air is compressed to the pressure in the plant. At this pressure, however, the absorbing power of the secondary air for nitrogen oxide in the blow-off stage is very limited. A substantial increase in the nitrogen oxide content at the absorption stage cannot therefore be obtained. In addition, the cost of preheating and cooling the washing acid outweighs the savings in the absorption stage.

A considerable increase in the amount of nitrogen oxide conducted through the system according to this principle is certainly obtained in processes in which the oxidation is effected at normal pressure. In degasification carried out under no pressure, the possible loading of the secondary air with nitrogen oxides is considerably higher. The nitrogen oxide content of the gas in the absorption stage can, in this way, be increased to about double the original value. While in this case the absorption costs in the production of nitric acid having concentrations over 70 percent by weight can be reduced to a fraction of that with conventional processes, there arise, apart from the cost of preheating and cooling the washing acid, increased costs for the low pressure oxidation, as well as the greatly increased energy costs required for the compression of the nitrous gases, since in addition, the nitrogen oxide gases fed into the system must be compressed.

The procedure described above is intended as a process, in which by the absorption of $NO_2$ from nitrous gases, nitric acid having a concentration above the azeotropic point of the nitric acid — water mixture (about 68 percent by weight) can be produced, this is then separated in a rectifying stage into a highly concentrated nitric acid having a concentration of for example of 99 percent by weight and azeotropic acid, and the latter then recycled back into the absorption stage for concentration in the rectifier.

An object of the invention is to provide a process of the above-mentioned kind in which the cost of absorption and the cost of energy for compressing the gas are substantially reduced.

This object is attained according to the invention by blowing off the $NO_2$ from the washing acid at the absorption pressure and at a temperature higher than the temperature in the washing stage, through the nitrous gas stream formed in the ammonia oxidation stage in a degasification stage arranged in advance of the absorption stage.

The process according to the invention has the following advantages over the known processes. The quantity of $NO_2$ conducted through the circulating system can be considerably increased. As a result, the absorption costs can be reduced to a fraction of that necessary in the known processes. Moreover, the costs for the additional process steps are quite low. If the absorption pressure as compared to that used in the known processes is reduced, a further reduction in the energy costs is realized. By applying the invention to a two-pressure process, the greater part of the nitrogen oxide in the circulation is no longer compressed so that the energy costs for gas compression are reduced. In addition, the heat balance is improved because the heat of the nitrous gases can be used for preheating the loaded washing acid, which heat would otherwise have too be conducted off by the cooling water.

Basically there are two possible forms of executing the process in accordance with the invention:

1. The acid produced is incorporated into the washing acid circulation. The concentration of the washing acid is equal to the concentration of the acid product, in order to balance out the quantities of acid in the washing acid circulation, i.e., in order to be able to obtain a filled washing acid circulation. A further advantage lies in that the acid produced and the washing acid can be blown off in one single apparatus by means of secondary air.

2. The acid produced is conducted into a separate washing circuit via a degasification column with secondary air and a second washing stage, the washing acid being separated therefrom through a degasification column with nitrous gas and a first washing stage directly following the absorption zone. This procedure has the advantage particularly in the case of a highly concentrated acid product that the washing acid concentration can be chosen at the optimum value independent of the acid produced, so that the thermodynamic balance in the blowing out and washing stages can be maintained independent of the product. The degree of oxidation of the gases in both of these stages can be selected at a lower value.

Figure 2:
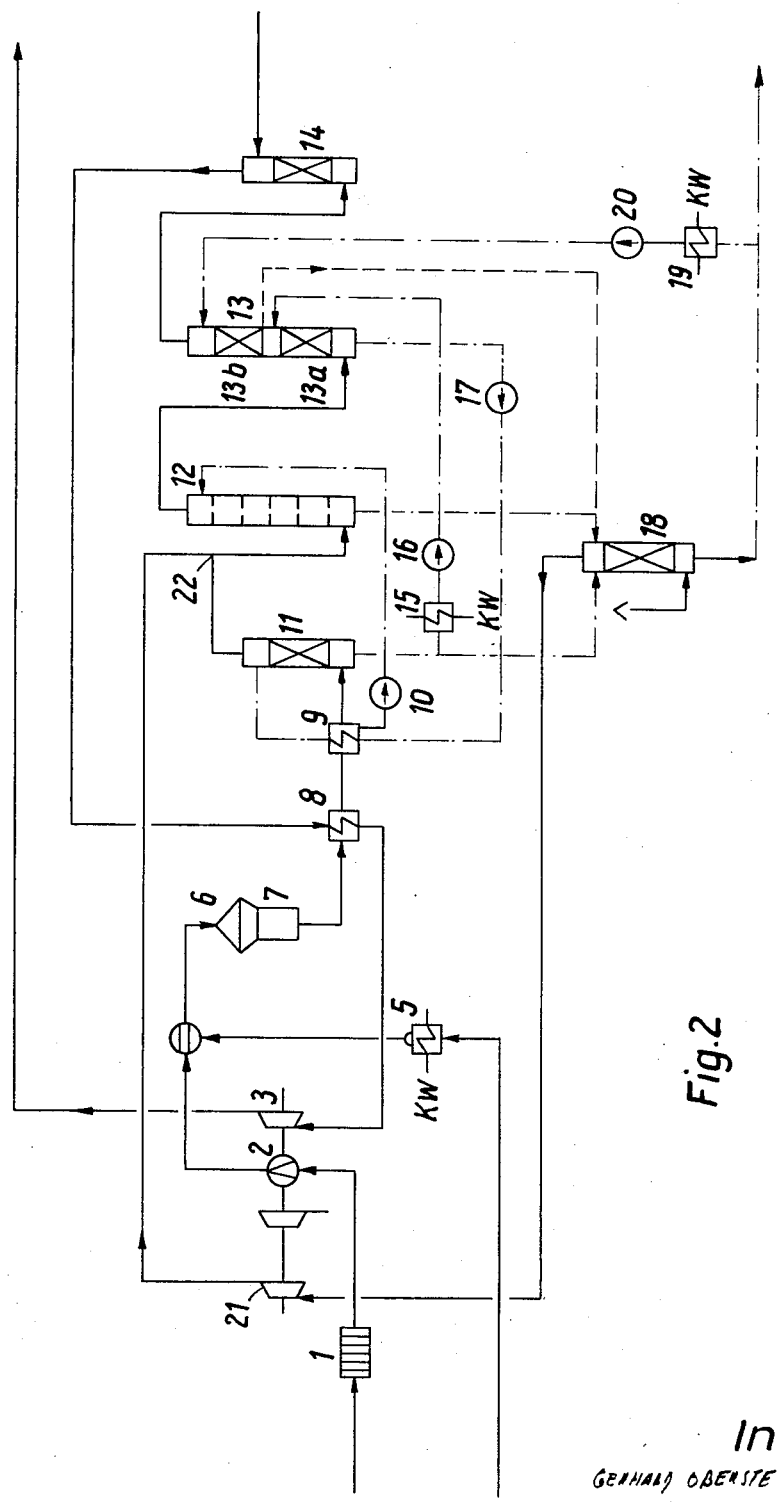
Figure 3:
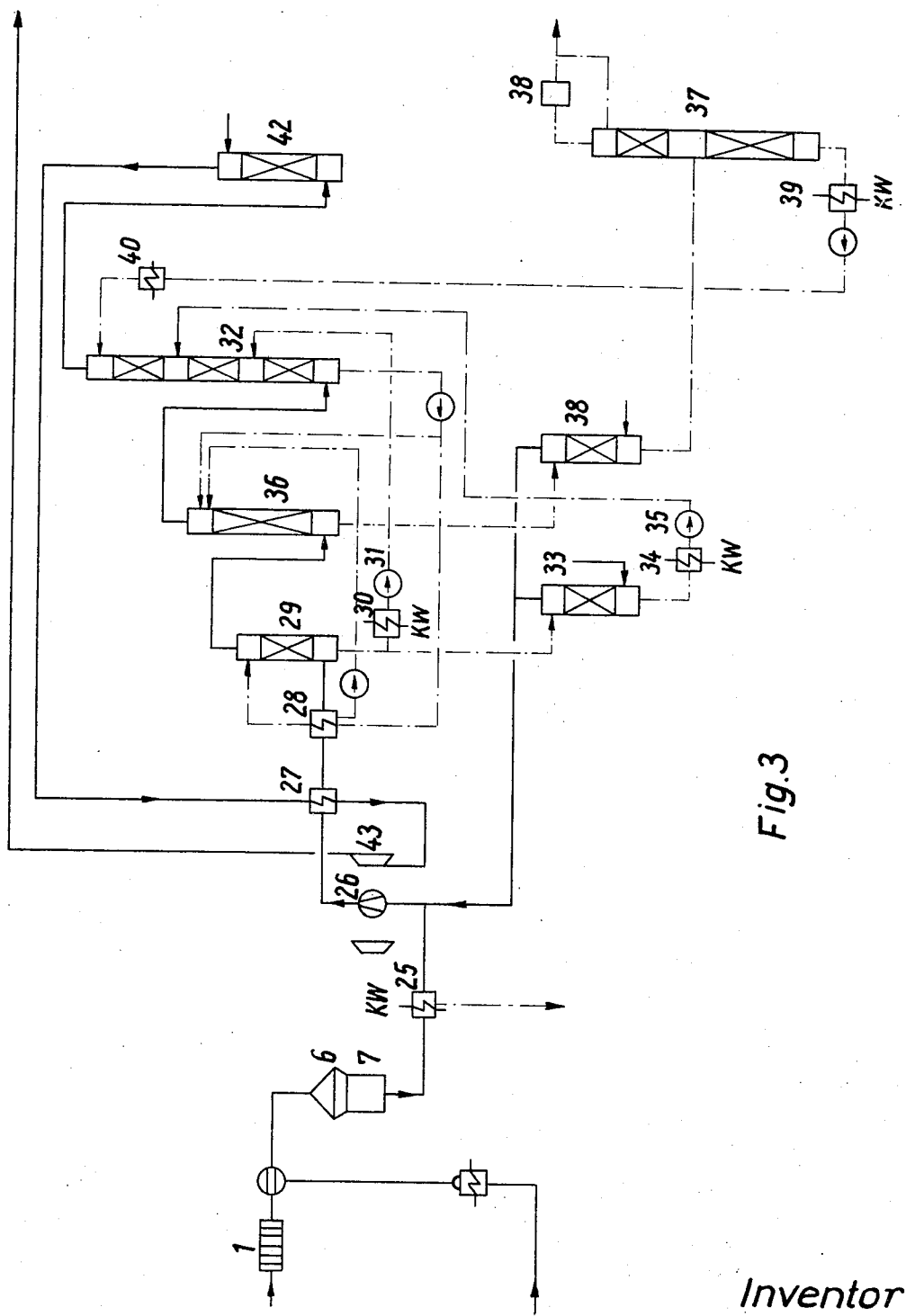

The two forms of execution of the invention are now described with reference to the accompanying drawings in which:

FIGS. 1 and 2 are flow diagrams of a plant in which the ammonia oxidation and the absorption take place at about the same pressure; and FIG. 3 is a flow diagram of a plant in which the ammonia oxidation and the absorption take place at different pressures.

In the plant, according to FIG. 1, the air required for the process after the cleaning thereof in an air filter 1 is compressed in a compressor 2 to a pressure of 2 to 10 atmospheres, for example, 4 atmospheres. After branching off a part for use as secondary air, the mixing with the ammonia is effected. If the ammonia available is in liquid form, it is first vaporized in an ammonia vaporizer 5. The air-ammonia mixture then passes through a fine filter and into an oxidation chamber 6 in which, in the presence of a platinum rhodium catalyst, there is carried out the conversion of the ammonia into nitrous oxide and water, at temperatures of between 800° C. and 950° C. The reaction gases are then cooled, the heat energy is recovered and used partly in a steam generator 7 and partly for the pre-heating of the end gases in a heat exchanger 8. In a condenser-cooler 9, the greater part of the reaction water is precipitated out forming an acid condensate having a concentration of 20 to 40 percent, and this is conducted by means of a pump 10 to a concentration zone in an absorption column 12.

The cooling medium is the washing acid delivered from a washing column 13 which has been pre-heated in the cooler 9 before its entry into the blow-out column 11.

The nitrous gases finally pass into the blow off column 11 in which the charged washing acid from column 13 is is freed from nitrogen tetroxide to a residual content of for example 0.5 to 2.0 percent by weight of $N_2O_4$, whereby the nitrogen oxide content of the main gases is increased to several times the original value.

Before entry into column 11, by suitable dimensioning of the gas space, the oxidation of NO to $NO_2$ can be sufficiently advanced that the gas and washing acid are in thermodynamic equilibrium, so that neither acid nor $NO_2$ is absorbed with the formation of acid.

The desorption heat necessary for blowing off the nitrogen tetroxide is supplied by the heat of the gases, the heat of oxidation as well as the heat liberated by the condensation of the residual water vapor.

Column 11 is preferably constructed as a filler body column as the ratio between the amounts of gas and acid permit hydrodynamically favorable operation without circulation of acid.

The washing acid which is largely free of nitrogen-oxide is after cooling in a cooler 15, fed in part by a pump 16 into the first stage of the wash column 13, and in part after blowing off the residual tetroxide by means of secondary air in a degasification stage 18 and cooling in a cooler 19, led back by a pump 20 into the second stage of the washing column 13.

In the apparatus of FIG. 1, the degasification of the washing acid is carried out with secondary air together with the acid produced from the absorption colum 12.

In the above, it is assumed that the concentration of the washing acid is equal to the concentration of the acid produced. The advantage of the combined degasification lies, apart from the elimination of a second degasification column, in the better utilization of the secondary air as well as simplified operation of the system especially when starting up and shutting down. The washing circulation can be made up from the acid product tank or the washing acid can be emptied therein.

Obviously the concentration of the washing acid system can also be chosen as to be different from the concentration of the acid product which is advantageous especially at very high acid concentrations.

After leaving column 11, the nitrous gases pass into the absorption column 12 in which the $NO_2$ is absorbed with the formation of nitric acid. The gas and acid flow in countercurrent relationship to one another. At the top of the column, process water or condensate is passed from column 14. The delivery of acid condensate from cooler 9 is effected at a zone of corresponding concentration. The acid product is removed from the sump of the column.

The absorption column 12 is preferably constructed as a sieve plate column having internal condenser coils or a filler body column having flow stages and external cooling. The nitrogen oxide remaining in the gas after absorption, which corresponds in amount approximately to the nitrogen oxide amount in the circulation, is finally washed out in wash column 13.

Column 13 is formed as a two-stage filler body column. In the first stage 13a, the washing acid is led from the blowoff stage 11 containing about 0.5 to 2 percent by weight of $N_2O_4$ after cooling in the cooler 15; in the second stage 13b, the washing acid is led to the degasification tower 18. The charged acid is removed from the sump of column 13.

As indicated by the broken lines in FIG. 1, the washing acid in the second stage 13b of column 13 can be fed into a separate circulation in which the concentration of washing acid is the same as the concentration of the acid product.

In order to obtain an extremely low end gas content of below 200 ppm of NO + $NO_2$, the washing acid before passing into the second stage 13b is cooled with brine to a temperature below 0° C., for instance, to −20° C. The necessary cooling energy can be derived either from a separate cooling plant or by the condensation of the ammonia at normal pressure. In this case the ammonia gas must be compressed to the pressure of the system.

During the washing process, the washing acid is heated up by the heat of absorption. In the case of very large quantities of $NO_2$ in the circuit, the acid in the wash column must therefore pass through a number of intermediate cooling stages.

The gas leaving washing column 13 still contains appreciable quantities of acid vapor. In an after-wash column 14, this acid is washed out with water or acid condensate. The gas which is practically free of nitrogen oxide is finally preheated in a heat exchanger 8 and compressed in a turbine 3 and serves for driving the compressor 2.

FIG. 2 illustrates diagrammatically a system which corresponds to the system of FIG. 1, but differs from that system insofar as the secondary air flow in the degasification stage 18 is at atmospheric pressure. The gaseous mixture consisting of secondary air and nitrogen oxides is led into the compressor 21 and therein compressed, entering the main gas stream at 22.

As the secondary air is more highly charged with nitrous gases the lower the pressure is, by reason of this difference the main gas stream in this system conveys more nitrous gases than in the system of FIG. 1.

FIG. 3 illustrates flow diagram of a plant in which the oxidation of ammonia and the absorption stage are effected at different pressures and the acid produced (super azeotropic) is separated in a rectifier stage into a highly concentrated nitric acid (i.e., 99 percent) and an azeotropic acid, which is led back to the absorption stage for concentration in the rectifier.

Air and ammonia gas are mixed and at about atmospheric pressure and are then reacted in the oxidation chamber 6 by means of a platinum-rhodium mesh at about 800° to 950° C. to thereby form NO and water.

The reaction gases are cooled in the cooler 7 in which the heat energy of the vapor produced is utilized. The discharge of the residual heat and the condensation of the greater part of the reaction water with the formation of an about 2 percent acid condensate takes place in condenser 25. A part of the condensate corresponding to the water balance is led off. After the introduction of secondary air loaded with nitrogen oxides, the nitrous gases are compressed in a compressor 26 to a pressure of about 4 to 7 atmospheres. The heat of compression serves for preheating the end gas in heat exchanger 27. The precipitation of the residual water takes place in a condenser 28 in which the discharge washing acid is preheated to about 10° C. Finally, the gases pass to a degasification column 29 in which the loaded washing acid is freed from dissolved nitrogen oxides up to a residual content of about 0.5 to 2 percent by weight of $N_2O_4$, whereby the nitrogen oxide content of the nitrous gases is increased from about 7 percent to about 14 to 21 percent by volume. The washing acid which is substantially free of nitrogen oxides is led in part, after cooling in a cooler 30 by means of a pump 31, to the lower stage of a washing column 32, and in part to a degasification column 33 wherein by means of secondary air, it is practically freed from dissolved nitrogen oxides and after cooling in a cooler 34, it is led by means of pump 35 to the second stage of the washing column 32.

The main gases finally pass into an absorption column 36 in which a part of the nitrogen oxide is absorbed with the formation of acid. There is fed into this column condensate from condenser 25 which first passes through washing column 42, the condensate from 28 and the azeotropic acid charged with nitrogen oxides from the washing column 32 corresponding to the amount of acid discharged from a rectifier column 37. In the sump of the column, nitric acid flows off at a super-azeotropic concentration which, after blowing off the nitrogen oxide by means of secondary air in a degasification tower 38, is separated in the rectifier column 37 into a high percentage nitric acid vapor, which is condensed in a condenser 38, and azeotropic acid. The latter, after cooling in the coolers 39 and 40 is led by pump 41 to the upper stage of the washing column 32.

In column 32, practically all the nitrogen oxide is washed out from the gas by acid of approximately azeotropic structure. Residual acid vapor is precipitated in column 42 by means of a condensate having a concentration of about 2 percent. The residual gas after preheating in heat exchanger 27 is used to power a turbine 43 which serves for driving the nitrous gas compressor.

We claim:

1. In a process of obtaining nitric acid from the gases produced by ammonia oxidation to nitrogen oxides, wherein
    i. the product gas stream from the ammonia oxidation is cooled to condense and remove water from the stream, with secondary air for oxidation of said nitrogen oxides being added to the gas stream either prior to or subsequent to said cooling,
    ii. the oxidized gas stream from (i) is treated with the condensate from (i) in an absorption stage to form nitric acid,
    iii. the gas stream emitted from the absorption stage in (ii) is washed with a nitric acid wash liquid to remove residual nitrogen oxides, and
    iv. the wash liquid from (iii) is gas stripped to remove the nitrogen oxides, which nitrogen oxides are then returned to the absorption stage,
the improvement comprising
    using as said wash liquid in step (iii) a nitric acid having a concentration of 60 to 75 weight percent, and using as a stripping gas for step (iv) the cooled gas stream of step (i) from which the water has been condensed and removed, said stripping being at a higher temperature than said washing.

2. The improved process of claim 1 wherein the stripping is conducted at about the same pressure as the absorption stage, and the stripped wash liquid is cooled and recycled to the washing stage.

3. The improved process of claim 1 wherein the product acid formed in (ii) is degasified by stripping it with an air stream.

4. The improved process of claim 1 wherein a portion of the nitric acid wash liquid that has been stripped in (iv) is further stripped with an air stream, following which at least a portion of the liquid is cooled and then used to further wash the gas stream emitted from (iii) so as to remove more of the residual nitrogen oxides from that stream.

5. The improved process of claim 4 wherein the concentration of the nitric acid wash liquid used in (iii) is the same as the concentration of the nitric acid formed in (ii), and the portion of the wash liquid that is further stripped with an air stream is so stripped while in admixture with the nitric acid formed in (ii), part of the air-stripped mixed acid stream is cooled and then used to further wash the gas stream emitted from (ii) so as to remove more of the residual nitrogen oxides from that stream, and the remaining portion of the air-stripped mixed acid stream is removed from the process as product nitric acid.

6. The improved process of claim 5 wherein the cooling of the portion of the air-stripped mixed acid stream that is to be used to further wash the gas stream emitted from (iii) is effective to lower the temperature of that portion to 0° to −20° C., and said portion, after being used for said further washing, is then returned to the air-stripping stage and is stripped while in admixture with the nitric acid formed in (ii).

7. The improved process of claim 1 wherein the nitric acid wash liquid from (iii), prior to being conducted to step (iv), is heated through indirect heat exchange by using it as cooling medium to effect the cooling in (i).

8. The improved process of claim 1 wherein the concentration of the nitric acid formed in (ii) is superazeotropic, said acid is degasified by stripping it with a secondary air stream and is then conducted to a rectifier wherein it is divided into a high percentage nitric acid overhead and an azeotropic nitric acid bottoms, and said bottoms fraction is used as nitric acid wash liquid in (iii).

9. The improved process of claim 1 wherein the ammonia oxidation is conducted at a pressure equal to or below the absorption stage pressure.

10. The improved process of claim 9 wherein the ammonia oxidation is conducted at about the same pressure as the absorption stage, and the secondary air is added to the gas stream from the ammonia oxidation after said stream has been both cooled and used to strip the wash liquid in (iv).

11. The improved process of claim 9 wherein the gas stream from the ammonia oxidation is compressed before being subjected to the absorption stage, the absorption stage is conducted at a higher pressure than the ammonia oxidation, and the secondary air is added to the gas stream from the ammonia oxidation before said gas stream is compressed.

12. The improved process of claim 9 wherein the ammonia oxidation is conducted at about the same pressure as the absorption stage, a portion of the nitric acid wash liquid that has been stripped in (iv) is further stripped with a secondary air stream at a lower pressure than the absorption stage pressure, and the secondary air stream used to strip the acid is then compressed and conducted to (i).

13. The improved process of claim 1 wherein (iii) and (iv) are conducted in filler body columns without internal circulation.

14. The improved process of claim 6 wherein (iii) and (iv) and the further washing of the gas stream emitted from (iii) are conducted in filler body columns without internal circulation.

15. The improved process of claim 1 wherein the nitric acid formed in (ii) has a concentration of over 70 weight percent.

16. The improved process of claim 15 wherein the ammonia oxidation is conducted at a temperature of 800° to 950° C., the condensate from (i) has an acid concentration of 20 to 40 percent, the absorption stage pressure is in the range of about 3 atmospheres to 10 atmospheres, and the nitric acid wash liquid that has been subjected to the stripping operation of (iv) has an $N_2O_4$ content of 0.5 to 2 weight percent.

17. The improved process of claim 1 wherein the degree of the oxidation of the nitrogen oxides with the secondary air is so controlled that the wash liquid and stripping gas in (iv) are in thermodynamic equilibrium.

* * * * *